INVENTORS.
Henry A. Seesselberg,
and Richard Beck

INVENTORS.
Henry A. Seesselberg
and Richard Beck

United States Patent Office 3,505,548
Patented Apr. 7, 1970

3,505,548
CONTROL SYSTEM FOR ELECTRIC CLUTCH COUPLED DRIVE
Henry A. Seesselberg, South Plainfield, and Richard Beck, Morris Plains, N.J., assignors to The Singer Company, New York, N.Y., a corporation of New Jersey
Filed Nov. 4, 1968, Ser. No. 773,119
Int. Cl. F16d 27/02
U.S. Cl. 310—95         13 Claims

ABSTRACT OF THE DISCLOSURE

A system using pulse width modulated feedback for controlling with digital circuitry the speed of an electric clutch-coupled drive, preferably of the electric clutch motor type, said system comprising a speed sensor such as a tachometer generator for sensing the output speed of the clutch and producing a periodic waveform whose frequency is proportional to the speed, a pulse shaping amplifier circuit for taking the speed sensor output and applying a short constant amplitude pulse to a frequency divider circuit having an adjustable division ratio, which produces at its output a single pulse for every N pulses at its input. The output of the frequency divider circuit is derived from a triggering means such as a unijunction transistor whose output triggers a monostable multivibrator having its normally off side coupled through a power amplifier, if deemed necessary, to a clutch coil current-controlling transistor normally in a conductive state, thereby regulating the average current applied to the clutch coil. Thus, there is applied to the clutch coil a pulse train of varying duty cycle, with the duty cycle, that is on time vs. off time being inversely proportional to the output frequency of the speed sensor. Therefore, since the output speed of the clutch is proportional to the average clutch coil current the speed may be regulated automatically by varying the excitation of the clutch coil by the heretofore described circuit arrangement. The desired output speed initially may be set by means of the divider ratio N, which value is controlled by a variably adjustable circuit element such as a potentiometer or a variable capacitance operably connected in the frequency divider circuit.

BACKGROUND OF THE INVENTION

While systems are known in the prior art for performing automatic speed regulation in clutch coupled drives, these systems generally have used either means for rectifying and filtering the alternating speed sensor output, or have used a DC tachometer and DC amplifiers for the feedback function, or means for rectification only of the alternating speed sensor output with the subsequent DC amplification of the rectified output before application thereof to the clutch coil. These prior art systems require the use of DC amplifiers or low frequency AC amplifiers wherein the amplifiers must be reasonably linear and stable, and the circuitry is much more susceptible to changes in the value of the circuit components, thus making it essential to design the components with very tight tolerances and to allow for environmentally caused value changes.

The present invention overcomes the above prior art deficiencies by providing a system that make use of digital circuitry, which is substantially less susceptible to the above discussed circuit value changes. Further, such circuits are substantially easier to design, build and check out for operability.

Accordingly, it is a primary object of this invention to provide a novel and improved digital system for regulating the speed of an electric clutch coupled drive.

It is a further object of this invention to provide a system for maintaining substantially constant speed regulation of the load and which overcomes the prior art difficulties mentioned above.

A further object of this invention is to provide a frequency controlled closed loop system for provided in a novel and improved manner speed regulation of an electric clutch coupled drive.

Having in mind the above and other objects that will be evident from an understanding of the disclosure, the invention is illustrated and described in the presently preferred embodiments thereof which are hereinafter set forth in such detail as to enable those skilled in the art readily to understand the function, operation, construction and advantages of them when read in conjunction with the accompanying drawings in which:

BRIEF DESCRIPTION OF THE INVENTION

Figure 1:
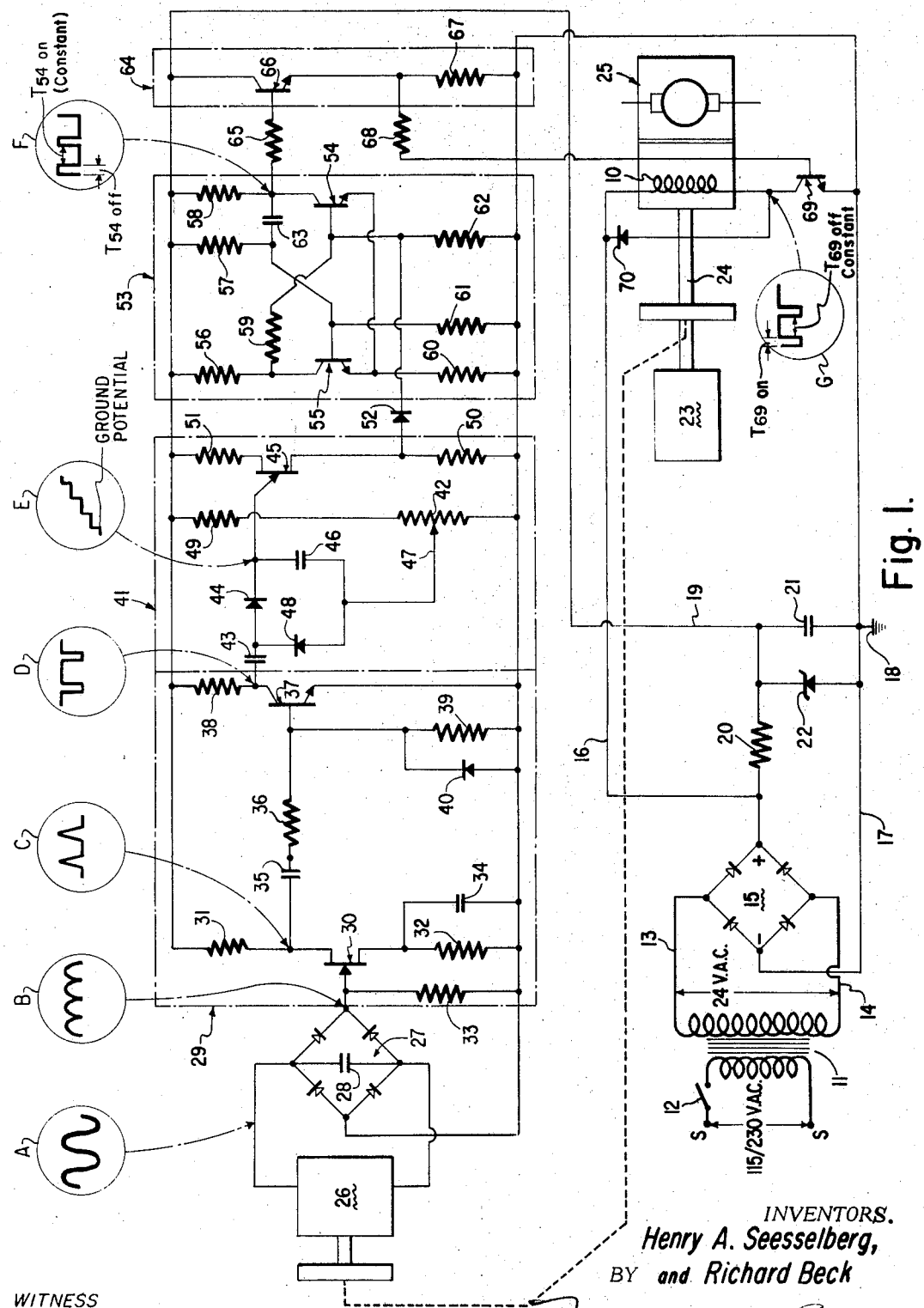
Figure 2:
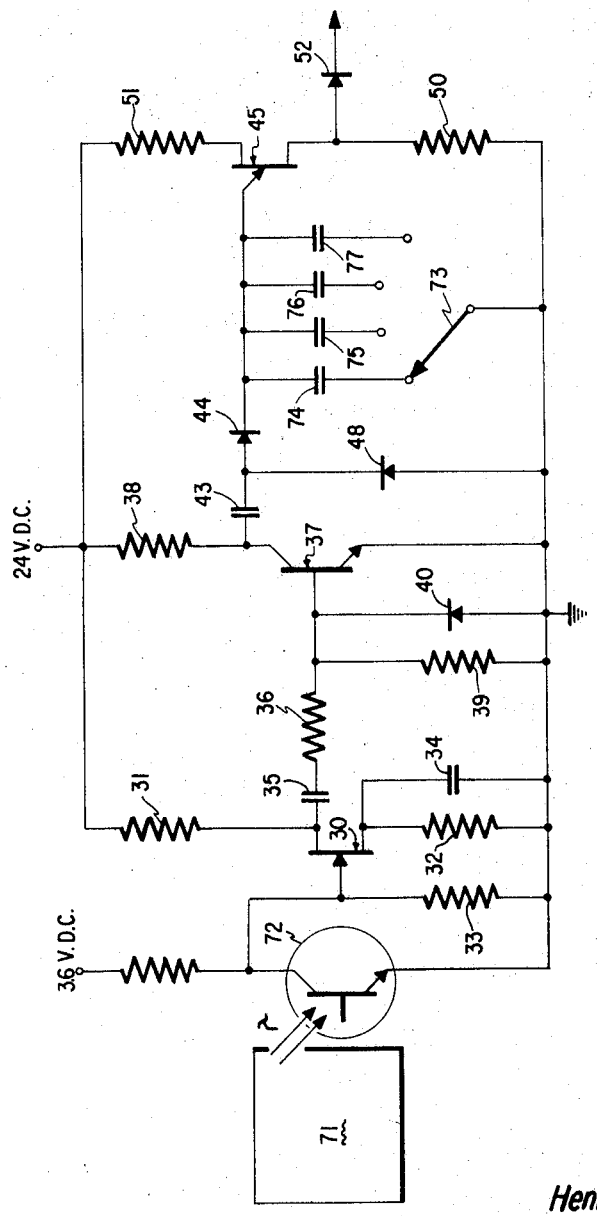

FIG. 1 is a schematic wiring diagram showing a system configuration of an embodiment of this invention; and
FIG. 2 is a modification of a portion of the system shown in FIG. 1.

DESCRIPTION OF THE PREFERRED EMBODIMENTS

The systems of the present invention finds use in an electromagnetic clutch-brake driving device of the type shown and described, for example, in the copending U.S. patent application Ser. No. 714,680, filed Mar. 22, 1968, assigned to the assignee of the present invention. As will be apparent from the following description the invention has relatively broad utility in any type of electric clutch coupled drive and is particularly useful in sewing machine drives or as a part of a needle positioning system used in combination with a sewing machine.

Referring more specifically to the accompanying drawings, wherein like reference numerals denote similar components throughout the figures, there is shown in FIG. 1 a circuit for supplying the power requirements of the speed control system comprising a step-down transformer 11 connected to a source S—S of AC supply voltage through the usual switch 12 for supplying an AC voltage to power lines 13 and 14. Typically an AC line voltage of 115 volts or 230 volts is stepped down by the transformer 11 to an AC value of substantially 24 volts. The latter voltage is supplied to a full-wave bridge rectifier 15, which produces a rectified unfiltered DC supply of 24 volts to lines 16 and 17, with the positive voltage being supplied to line 16 and the negative voltage to line 17 which is grounded at 18. A filtered voltage is supplied from the positive output terminal of the bridge rectifier 15 to the line 19 by means of a filter network comprising a resistor 20 and a capacitor 21. A Zener diode 22 connected across the output of the filter network regulates the voltage supplied to the line 19.

The present system, as mentioned above, finds particular utility with a sewing machine or for that matter any clutch-coupled drive generally designated by the load 23, which is coupled to an output shaft 24 of an electric clutch type motor generally designated 25. The clutch output shaft 24 is coupled mechanically to a speed sensing means 26, such as an AC tachometer (FIG. 1) or a photo-tachometer (FIG. 2), either of which when used, for example, with a sewing machine, may be coupled to the handwheel of the machine to provide the necessary speed information to the control circuitry of the system to be described below. If it is assumed that the system is running at stable speed the AC tachometer generator 26 produces a sinusoidal output signal like that shown at A. It should be noted that the waveforms depicted in A through G, inclusive, are illustrative only of the waveform shape and that of their relative amplitude. This signal is fed to a conventional full-wave bridge rectifier 27 having a capacitor 28 connected across the bridge input terminals to suppress any undesirable noise. The bridge doubles the frequency of its input signal A and produces an output signal as illustrated at B. The signal B is fed into a pulse shaping amplifier stage 29. The amplifier stage 29 comprises an input stage including a field effect transistor 30 having its drain and source connected respectively through bias resistors 31 and 32 to the power supply lines 19 and 17. The gate of transistor 30 is biased appropriately through a resistor 33. A bypass capacitor 34 is connected across the resistor 32. The component values of the input stage are chosen such that it is biased to clip the input signal B and produce a waveform at its drain output electrode such as shown at C. The signal C is A-C coupled through a series network comprising a capacitor 35 and a resistor 36 to the output NPN transistor stage 37 of the amplifier 29, which transistor, normally is biased to cutoff, that is, so that it normally draws no collector current. The NPN transistor 37 is connected in a common-emitter configuration having its collector coupled to the power supply line 19 through a resistor 38 and its emitter connected directly to ground, and the base electrode connected to the supply line 17 through a biasing resistor 39. The A-C coupled signal C will cause the base voltage to swing above and below the emitter voltage of the transistor 37, however, there is provided a diode 40 having its cathode connected to the base of the transistor 37 and its anode connected to ground to provide a shunt path for the negative portions of the input signal C, thereby making only the positive portions of the signal C effective to bring the transistor 37 into conduction. The pulse-shaped output waveform taken from the collector of the transistor 37 is depicted at D.

The output signal D is coupled to a frequency divider circuit 41 having a variable division range of approximately 30 to 1 controlled by a potentiometer 42, which may be connected by suitable means to a manually actuated control such as the treadle for the sewing machine. The speed of the driven member 23 is proportional to the division ratio so that as the division ratio is increased the speed of the driven member likewise increases in a manner to be explained below. The divider circuit includes a first capacitor 43 connected to the output collector electrode of the transistor 37, a forward conducting diode 44 having its anode connected to the capacitor 43 and its cathode connected to the control emitter electrode of a unijunction transistor 45. Also connected to the cathode of the diode 44 is one terminal of a second capacitor 46 with its other terminal being connected to the wiper arm 47 of the potentiometer 42. At the junction between the capacitor 43 and the diode 44 there is connected the cathode of a diode 48 whose anode is connected to the junction of the capacitor 46 and the potentiometer wiper arm 47. The potentiometer 42 is connected at one terminal to the positive supply line 19 by a resistor 49 and at its other terminal directly to ground. When no input pulse is present at the base of the transistor 37 or in other words during its cutoff condition the collector voltage thereof will rise to the supply voltage of line 19 and current will be drawn through the resistor 38, the capacitor 43, the diode 44 whose conduction path is in the direction of current flow, the capacitor 46, the wiper arm 47 and the portion of the potentiometer 42 connected between the wiper arm and ground 18. The rate of exponential decay of the current flowing through these elements is determined by a time constant whose value depends on the design values of the capacitors 43 and 46, and the resistors 38 and 42. Thus, it is apparent that if this RC time constant is substantially shorter than the period of the input signal to the transistor 37, the transistor 37 will conduct before the capacitors 43 and 46 are able to charge fully to a predetermined value of voltage between ground and the supply voltage. When transistor 37 is turned on its collector to emitter resistance drops from a very high value approaching infinity to substantially zero, thereby providing a path including the ground to wiper arm portion of the potentiometer 42, the diode 48 and the collector-emitter path of transistor 37 through which the capacitor 43 will discharge. The diode 48 is connected so as to prevent a similar discharge of the capacitor 46 therethrough and thus, the capacitor 46 retains its charged voltage. The above charging and discharging process is again repeated when the input pulse to the transistor 37 ceases and the transistor is again cut off. Thus, the charge voltage present on the capacitor 46 increases to a greater value until the transistor 37 is turned on again, thereby allowing the charged capacitor 43 to discharge therethrough. The voltage waveform present at the junction of the diode 44 and the capacitor 46 is depicted at E. The reference level at which this staircase type of waveform begins may be varied depending on the setting of the potentiometer wiper arm 47. Thus, if the wiper arm 47 is set at the ground side of the potentiometer 42 the wave will start at ground potential, as illustrated in the waveform E of FIG. 1, and will rise therefrom in steps generated during each charge cycle of the capacitor 46 as shown in E. When the wiper arm 47 is set at a potential level other than ground, the waveform E will start from some DC level above that of ground.

It is well known in the art that the unijunction transistor 45 has the characteristic that its emitter to base one impedance is very high until the voltage therebetween is approximately 0.6 of the base two to base one voltage whereupon reaching the latter voltage level, the previously high emitter to base one resistance approaches zero and conduction of the unijunction transistor results. Therefore, when the staircase wave E reaches a predetermined level after a certain number of input pulses to the transistor 37, the normally nonconductive unijunction transistor 45 will conduct and provide a discharge path for the capacitor 46 including a resistor 50 connected to the base one element and ground, and the wiper arm to ground portion of the potentiometer 42. This will cause the staircase wave E to reset to its original value, that is to return to its reference value as determined by the setting of the wiper arm 47, and also causes an output pulse to appear across the output resistor 50. The base two element is connected through a properly chosen resistor 51 to the positive voltage supply line 19. As soon as the capacitor 46 has discharged fully, current ceases to flow through the emitter of the unijunction transistor 45 and conduction thereof stops. As mentioned above the potentiometer 42 may be adjusted to change the reference DC level of the staircase wave E and by doing so the time required for the emitter of the unijunction transistor 45 to reach its firing voltage can be varied. Thus, with the wiper arm 47 set at ground the number of input pulses required to produce one output pulse is approximately $(C43+C46)/C43$ defining one limit and the other limit is when the wiper arm 47 is set to a DC level just below the firing voltage of the unijunction transistor 45 where only a single input pulse is required to produce a single output pulse. Thus, there is provided a frequency divider circuit having a variable division ratio determined by the setting of the potentiometer 42.

The output of the frequency divider 41 then is coupled through a forward conducting diode 52 having its anode connected to the base one electrode of the unijunction transistor 45 to a conventional monostable multivibrator circuit 53 comprising NPN transistors 54 and 55, resistors 56 through 62, inclusive, and capacitor 63. The multivibrator is used as a relaxation oscillator to regulate the excitation of the clutch coil 10. The multivibrator has a normally stable off state and a quasi-stable on state, the latter having a fixed period of duration. The diode 52 couples the positive going pulse signal appearing across the resistor 50 to the base input electrode of the normally nonconductive transistor 54, whereupon the transistor 54 is turned on. The capacitor 63 couples the negative going pulse signal from the collector of the transistor 54 to the base input electrode of the transistor 55, which is normally conductive, to turn it off. The transistor 55 remains off until the voltage across the capacitor 63 increases to a level where the transistor 55 will be turned on again. This rate of capacitor voltage increase is exponential and is determined by the RC time constant of the capacitor 63 and the resistors 57, 58 and 61. When the transistor 55 goes on again the voltage at its collector is divided by the resistors 59 and 62, and is applied to the base of the transistor 54 causing the latter to be turned off, that is, to be returned to its normal state. Each time the unijunction transistor 45 emits an output pulse the foregoing described cycle is repeated. The period of time that the transistor 54 remains in its on or quasi-stable state is fixed at approximately 15 milliseconds as determined by the choice of the circuit component values of the multivibrator. The period of time that the transistor 54 remains in its off or stable state is a function of the period of the pulse train input coming from the frequency divider circiut 41. As will be apparent from the following description if the division ratio of the divider circuit 41 (as determined by the setting of the potentiometer 42) increases, the speed of the driven member 23 also increases. This increase in speed is due to the lower rate of pulses being applied to the monostable multivibrator 53 including the transistors 54 and 55, which results in a longer off time for the transistor 54. Thus, when the transistor 54 is off its collector rises to the value of the positive voltage supply line 19 and the period of the positive going pulse generated at the collector will increase as the input pulse frequency to the monostable multivibrator decreases. Thus, since the transistor 54 will remain off for a longer period of time, the positive pulse developed at the collector of transistor 54 during its off time will have a variable period determined by the frequency of the multivibrator input pulse frequency. This arrangement effectively provides a pulse width modulated control circuit. The output waveform of the multivibrator 53 is depicted at F.

The positive pulse developed during the off time of the transistor 54 having a variable period, as discussed above, may be coupled to a power gain amplifier stage 64, if deemed necessary, through a coupling resistor 65. The amplifier stage 64 includes a transistor 66 connected as an emitter follower for purposes of obtaining power gain and an output resistor 67 connected in its emitter electrode and across which the output pulse signal is developed. This pulse is coupled from the transistor emitter follower 66 through a resistor 68 to drive the base of a transistor 69 having a normally conducting state. The transistor 69 has its emitter-collector main current path connected between the clutch coil 10 and the grounded power supply line 17. Thus, the variable period pulse (depicted as T54 off in waveform F) applied to the base of the transistor 69 controls its on time and therefore, the energization of the clutch coil 10. Thus, whenever the transistor 54 is off, the transistor 69 is on and current will be drawn through the clutch coil. A reverse-biased diode 70 is connected across the clutch coil 10 shorts out any transients which may occur during the off time of the transistor 69. From the foregoing description it is seen that as the frequency division ratio increases the period between the pulses from the unijunction transistor 45 increases, thereby causing the transistor 54 to be off for a longer time and therefore, the transistor 69 is on for a greater period of time. Since under these conditions, more average clutch current is allowed to flow, this produces an increased clutch pressure and a corresponding increase in the output speed.

A closed loop system is created by mechanically coupling the clutch output shaft 24 to the tachometer generator 26 and by properly adjusting the clutch and the circuit characteristics, the system will reach an equilibrium speed determined by the division ratio set by the potentiometer 42. If, in this closed loop system, the motor driven load 23 should for any reason increase thereby tending to bring the system speed down, the frequency output of the tachometer generator 26 will drop accordingly. Therefore, the period between the pulses into and out of the frequency divider 41 will increase. This will result in a longer on time of the transistor 69 as discussed above and the same fixed off time of substantially 15 milliseconds. The resultant increase in the average clutch current supplied to the clutch coil 10 will cause more clutch pressure pushing the speed higher and returning it to the original speed before the added load situation occurred. Thus, by applying a pulse width modulated control signal to the clutch coil, that is, a pulse train having a varying duty cycle (on time vs. off time) which is inversely proportional to the frequency output of the tachometer generator 26, there is obtained the desired output speed control.

Although the system in FIG. 1 is shown as comprising the above described circuits and their respective components, it is to be understood that it is within the scope of this invention to replace these circuits and components with their functional equivalent. Further, the various semiconductor devices may be either of the P or N-type with the appropriate change in biasing. One such modification is shown in FIG. 2 wherein the speed sensing means comprises a photo tachometer generator 71 which may comprise the combination of a light source, photocells (e.g., photo transistors) and a plurality of slotted discs mounted on the driver output shaft for sensing the output speed. The sensed speed is applied in the form of a light supply signal to a photocell such as photo-transistor 72. The use of the phototransistor substantialy decreases the number of circuit components required, as shown in FIG. 2, since the output signal from the transistor 72 is applied directly to the gate of the field effect transistor 30. The output signal from the field effect transistor 30, like in FIG. 1, is AC coupled to the transistor 37, which normally is cut off. The frequency divider circuit is connected to the collector output of the transistor 37 and produces a result substantially like that of the divider circuit 41 of FIG. 1. As illustrated in FIG. 2 the resistive speed control including the potentiometer 42 may be replaced by a capacitive speed control unit including a switch 73 which may be remotely controlled from a manually engageable element such as the sewing machine treadle, and a plurality of selectively operable capacitors of different value, 74, 75, 76 and 77. The charge path discussed above for FIG. 1 now includes the resistor 38, the capacitor 43, the diode 44 and a selected one of the capacitors 74, 75, 76 and 77, which latter selection provides the desired variable division ratio and enables the operator to set the desired output speed. Thus, by varying the capacitance value and leaving all of the resistors fixed the rate of charge of the selected capacitor may be controlled and therefore, the firing of the unijunction transistor 25. This latter capacitive speed control may be used either with the photo tachometer 71 or the AC tachometer 26.

It will be understood that further various changes in the details, materials, arrangements of parts and operating conditions which have been herein described and illustrated in order to explain the nature of the invention may be made by those skilled in the art within the principles and scope of the invention as expressed in the appended claims.

Having thus described the nature of the invention, what we claim herein is:

1. A circuit for automatically controlling the speed of a driven member coupled to a drive member comprising: means for sensing the speed of said driven member and for generating an output signal having a frequency proportional to said speed, control means coupled to said speed sensor means for receiving said output signal and developing a pulse train having an on vs. off time inversely proportional to the frequency of the input signal, said pulse train derived from said control means being operatively coupled to means including a current-responsive element having a digital mode of operation in response to said pulse train, said current-responsive element coupling said drive member to said driven member, whereby there is provided negative feedback to said current-responsive element for controlling automatically the energization of said coupling means, said control means including a frequency divider circuit having adjustable circuit means for producing at its output a predetermined digital signal, said control means being constructed and arranged such that when the desired speed of the driven member changes the frequency divider circuit will compensate therefor by regulating the on vs. off time of the transmitted signal so that upon being applied to the current-responsive element it will provide the coupling means with the amount of energization required to bring the driven member to its original speed.

2. A circuit for energizing an electric clutch winding from a source of alternating signals to regulate the output speed of a member driven through the clutch by a driving member comprising: means for providing a signal proportional to the speed of said driven member, control circuit means including an adjustable frequency divider circuit for produicng a single signal at its output for a predetermined signal at its input, means for coupling said speed proportional signal to said control means, said frequency divider circuit including an adjustable circuit element for selectively establishing the desired output speed of said driven member, normally nonconductive trigger means coupled to the output of said frequency divider circuit for conducting upon application thereto of a predetermined input signal developed at said frequency divider output, said trigger means being coupled to signal-responsive circuit means having a stable condition and a quasi-stable condition of fixed duration, the duration of the stable condition being a function of the signal output of said trigger means, said circuit means being coupled to said clutch winding through a current-responsive element connected in circuit with said clutch winding for varying the degree of energization of said clutch winding in accordance with the output of said circuit means such that, upon deviation of the driven member from its original desired value of speed, the clutch winding is energized so as to compensate therefor and bring the speed to its original value.

3. A circuit according to claim 2 wherein said variable circuit element comprises a potentiometer.

4. A circuit according to claim 2 wherein said frequency divided circuit includes a charge path and at least one discharge path, said charge including a first capacitor and said variable circuit element for controlling the time constant of said charge path.

5. A circuit according to claim 4 wherein said variable circuit element comprises a potentiometer.

6. A circuit according to claim 2 wherein said variable circuit element comprises a selectively operable capacitance.

7. A circuit according to claim 4 wherein said variable circuit element comprises a selectively operable capacitance.

8. A circuit according to claim 4 wherein said variable circuit element comprises a potentiometer, said charge path comprising a series circuit including diode means, said first capacitor, a second capacitor and at least a portion of said potentiometer, one of said capacitors being connected both in the charge and discharge paths of said frequency divider, said diode being connected such that said one capacitor upon charging to a predetermined value turns on said normally nonconductive trigger means and discharges therethrough.

9. A circuit according to claim 2 wherein said current responsive element comprises a semiconductor having a control electrode and a main current path, said main current path adapted to be connected in series with said clutch winding, means connecting said control electrode to the output of said signal responsive circuit means, means for biasing said semiconductor element such that its normal operative condition is opposite to the stable condition of said circuit means, whereby the output signal of said circuit means controls the condition of said semiconductor element and thus, the degree of energization of said clutch winding.

10. A system for developing a constant speed output for a load adapted to be coupled to an electric clutch-coupled drive wherein the output speed of the clutch is proportional to the average clutch current, means adapted to supply power for said system, said system comprising sensor means operatively coupled to the output of said clutch-coupled drive for producing an output periodic signal proportional to said output speed, pulse shaping amplifier means connected to receive said periodic signal from said sensor means and to produce an output signal of substantially rectangular waveform, frequency divider means having a variable division ratio comprising a charging circuit including a capacitor with a selectively controlled rate of charge and unidirectional means for preventing discharge of said capacitor until it has charged to a predetermined DC level, said frequency divider including means for setting the desired load speed, trigger means having a normally off state comprising a semiconductor device having a control electrode connected to said capacitor, said trigger means conducting at said predetermined DC level and producing an output signal, oscillator means having a stable state and a quasi-stable state being coupled operatively to said trigger means for receiving said output signal therefrom, said quasi-stable state being of fixed duration, said oscillator means being operable in response to the output signal of said trigger means whereupon an output pulse signal is produced to set its quasi-stable state, signal responsive switch means having a main current path operably connected in circuit with said clutch for controlling the current supplied thereto, circuit means for coupling the output pulse of said oscillator means to said switch means, said switch means having a normal state and a signal-responsive state, the former corresponding to the stable state of said oscillator means, whereby the switch means automatically in response to a speed proportional signal will regulate the average clutch current such that the load speed is maintained at a substantially constant desired value.

11. A system according to claim 10 wherein said circuit means for coupling said oscillator means to said switch means comprises a power amplifier.

12. A system according to claim 10 wherein said switch means comprises a transistor having a main current path and a control electrode, said clutch including a clutch winding, said main current path being connected in series with said clutch winding and said control electrode being connected to said circuit means to receive the oscillator output signal therefrom.

13. A system according to claim 10 wherein said speed setting means comprises a potentiometer connected in the charge circuit of said capacitor for selectively regulating its rate of charge.

References Cited

UNITED STATES PATENTS 2,449,779   9/1948   Jaeschke _____ 310—95
3,061,747  10/1962   Schlicher _____ 310—95

DAVID X. SLINEY, Primary Examiner

U.S. Cl. X.R.

192—104